(12) United States Patent
Hisada

(10) Patent No.: US 8,698,369 B2
(45) Date of Patent: Apr. 15, 2014

(54) ROTOR OF ROTATING ELECTRICAL MACHINE

(75) Inventor: Tomokazu Hisada, Anjo (JP)

(73) Assignee: Denso Corporation, Kariya (JP)

( * ) Notice: Subject to any disclaimer, the term of this patent is extended or adjusted under 35 U.S.C. 154(b) by 106 days.

(21) Appl. No.: 13/492,042

(22) Filed: Jun. 8, 2012

(65) Prior Publication Data

US 2012/0313476 A1    Dec. 13, 2012

(30) Foreign Application Priority Data

Jun. 10, 2011    (JP) ................ 2011-129934

(51) Int. Cl.
*H02K 21/12* (2006.01)
*H02K 21/14* (2006.01)
*H02K 1/27* (2006.01)

(52) U.S. Cl.
USPC .............................. 310/156.53; 310/156.38

(58) Field of Classification Search
USPC ....................... 310/156.01–156.84
See application file for complete search history.

(56) References Cited

U.S. PATENT DOCUMENTS

| 8,106,557 B2* | 1/2012 | Yoshino et al. | 310/156.53 |
| 2007/0063607 A1* | 3/2007 | Hattori | 310/156.53 |
| 2009/0066181 A1* | 3/2009 | Abel et al. | 310/156.53 |
| 2010/0219712 A1 | 9/2010 | Kogure et al. | |
| 2010/0259123 A1* | 10/2010 | Nishijima | 310/156.53 |

FOREIGN PATENT DOCUMENTS

| JP | 2007-127044 | 5/2007 |
| JP | 2008-283823 | 11/2008 |

* cited by examiner

*Primary Examiner* — Tran Nguyen
*Assistant Examiner* — Leda Pham
(74) *Attorney, Agent, or Firm* — Nixon & Vanderhye PC

(57) ABSTRACT

When a corner part that is most distant from a perimeter surface of a rotor core is defined as a first corner part and a corner part in a position that faces the first corner part in a magnetization direction of a permanent magnet is defined as a second corner part, a gap is formed between the second corner part and an inner circumference side of a slot, and the inner circumference side of the slot that forms the gap has an arc surface that has a point X as a center on the inner circumference side of the slot that faces the first corner part. Therefore, the demagnetizing field by the magnetic flux from the stator side does not act intensively on the second corner part of the permanent magnet, and the demagnetizing field instead affects in a wide range of the permanent magnet equally.

12 Claims, 6 Drawing Sheets

ROTOR OF ROTATING ELECTRICAL MACHINE

CROSS-REFERENCE TO RELATED APPLICATION

This application is based on and claims the benefit of priority from earlier Japanese Patent Application No. 2011-129934 filed Jun. 10, 2011, the description of which is incorporated herein by reference.

TECHNICAL FIELD

The present disclosure relates to a rotor of a rotating electrical machine equipped in hybrid vehicles, electric vehicles, etc. and may also be applicable to the rotor for industrial apparatus, electrical home appliances, and the like.

BACKGROUND

A permanent magnet type rotating electrical machine that is equipped with a rotor where a permanent magnet s embedded as a rotating electrical machine is known.

As shown in FIG. 8A and FIG. 8B, a rotor 100 of a permanent magnet type rotating electrical machine is formed by inserting permanent magnets 103 into slots 102 formed in a rotor core 101.

In the permanent magnet 103, when a corner part that is most distant from a perimeter surface 101a, which is a peripheral surface in the stator side of the rotor core 101 is defined as a first corner part 103a, and a corner part in a position that faces the first corner part 103a is defined as a second corner part 103b, there is a possibility that the second corner part 103b becomes demagnetized permanently because the second corner part 103b is exposed to a strong demagnetizing field originating from the stator side.

Here, the demagnetizing field is defined as a magnetic field received from an exterior in a direction opposite to a magnetization direction of the permanent magnet 103.

That is, as shown in FIG. 8B, when the magnetic flux from the stator side short-cuts to the rotor core 101 near the first corner part 103a through the rotor core 101 near the second corner part 103b, there is a possibility that the demagnetizing field concentrates on the second corner part 103b may arise.

A technology protecting a permanent magnet against demagnetization by increasing a thickness in the magnetization direction in a part where it exposed to the demagnetizing field of the permanent magnet is disclosed in Japanese Patent Application Laid-Open Publication No. 2008-283823.

However, the thickness of the permanent magnet in the magnetization direction must be increased as a peak intensity of the demagnetizing field increases in order to prevent permanent demagnetization, and the problem that the amount of magnets increases arises.

SUMMARY

An embodiment provides a rotor of a rotating electrical machine that neutralizes a demagnetizing field that a permanent magnet receives from a stator, and reduces a peak intensity of the demagnetizing field that the permanent magnet receives.

In a rotor of a rotating electrical machine according to a first aspect, the rotor of a rotating electrical machine has a rotor core that has a peripheral surface that faces a stator, and a permanent magnet embedded in a slot formed in the rotor core.

The permanent magnet has a plurality of corner parts when seen from an axial direction of the rotor core.

When a corner part that is most distant from the peripheral surface that faces the stator of the rotor core is defined as a first corner part and a corner part in a position that faces the first corner part in a magnetization direction of the permanent magnet is defined as a second corner part, a gap is formed between the second corner part and an inner circumference side of the slot, and the inner circumference side of the slot that forms the gap has an arc surface that has a center on the inner circumference side of the slot that faces the first corner part.

The magnetic flux from the stator side tends to pass along the rotor core near the second corner part, and tends to short-cut to the rotor core near the first corner part.

However, in the present disclosure, the rotor core near the second corner part exists at an equal distance from the rotor core near the first corner part in which the magnetic flux from the stator side tends to short-circuit by disposing the gap between the second corner part and the inner circumferential surface of the slot, and by forming the inner circumferential surface of the slot that forms the gap to the arc surface.

Accordingly, a magnetic resistance near the second corner part is neutralized, the weaker magnetic flux is dispersed and passes through the near second corner part, and short-cuts to the rotor core near the first corner part.

For this reason, the demagnetizing field by the magnetic flux from the stator side does not act intensively on the second corner part of the permanent magnet, and the demagnetizing field instead affects in a wide range of the permanent magnet equally.

As a result, the thickness of the permanent magnet can be made smaller in the magnetization direction, and the number of magnets required can be reduced.

In the rotor of the rotating electrical machine according to a second aspect, the first corner part is contacted to the inner circumference side of the slot, and the center of the arc surface is a point that the first corner part of the inner circumference side of the slot contacts.

In the rotor of the rotating electrical machine according to a third aspect, when a side between the first corner part and the second corner part is defined as a first side in the permanent magnet, the inner circumference side of the slot that faces the first corner part includes the inner circumference side of the slot that contacts to the first side, and the center of the arc surface is a point nearest to the second corner part in the inner circumference side of the slot that contacts to the first side.

In the rotor of the rotating electrical machine according to a fourth aspect, the permanent magnet is arranged so that the magnetization direction inclines to a radial direction of the rotor core, and has the second corner part and the first corner part in the first end side in a direction substantially perpendicular to the magnetization direction, and a thickness of the permanent magnet in the first end side is thinner than a thickness of the permanent magnet in the second end side.

In the rotor of the rotating electrical machine according to a fifth aspect, the permanent magnet is made of a plurality of magnet pieces, the plurality of magnet pieces are disposed side by side along with the direction substantially perpendicular to the magnetization direction so that the magnetization directions of the magnet pieces face the same direction, and thicknesses of the plurality of magnet pieces disposed in the first end side are thinner than thicknesses of the plurality of magnet pieces disposed in the second end side.

In the rotor of the rotating electrical machine according to a sixth aspect, the plurality of magnet pieces are arranged so that sides that face the stator in the magnetization direction become flush with each other.

DETAILED DESCRIPTION OF THE PREFERRED EMBODIMENTS

With reference to the drawings, hereinafter will be described embodiments of the present disclosure.
[The First Embodiment]
[Composition of the First Embodiment]

A rotating electrical machine 1 of the first embodiment is explained using FIG. 1 to FIG. 4.

The rotating electrical machine 1 of the first embodiment is a motor generator, and is provided with a stator 2 that can generate a rotating magnetic field, and a rotor 3 disposed to an inner circumferential side of the stator 2 and rotates.

Figure 1:
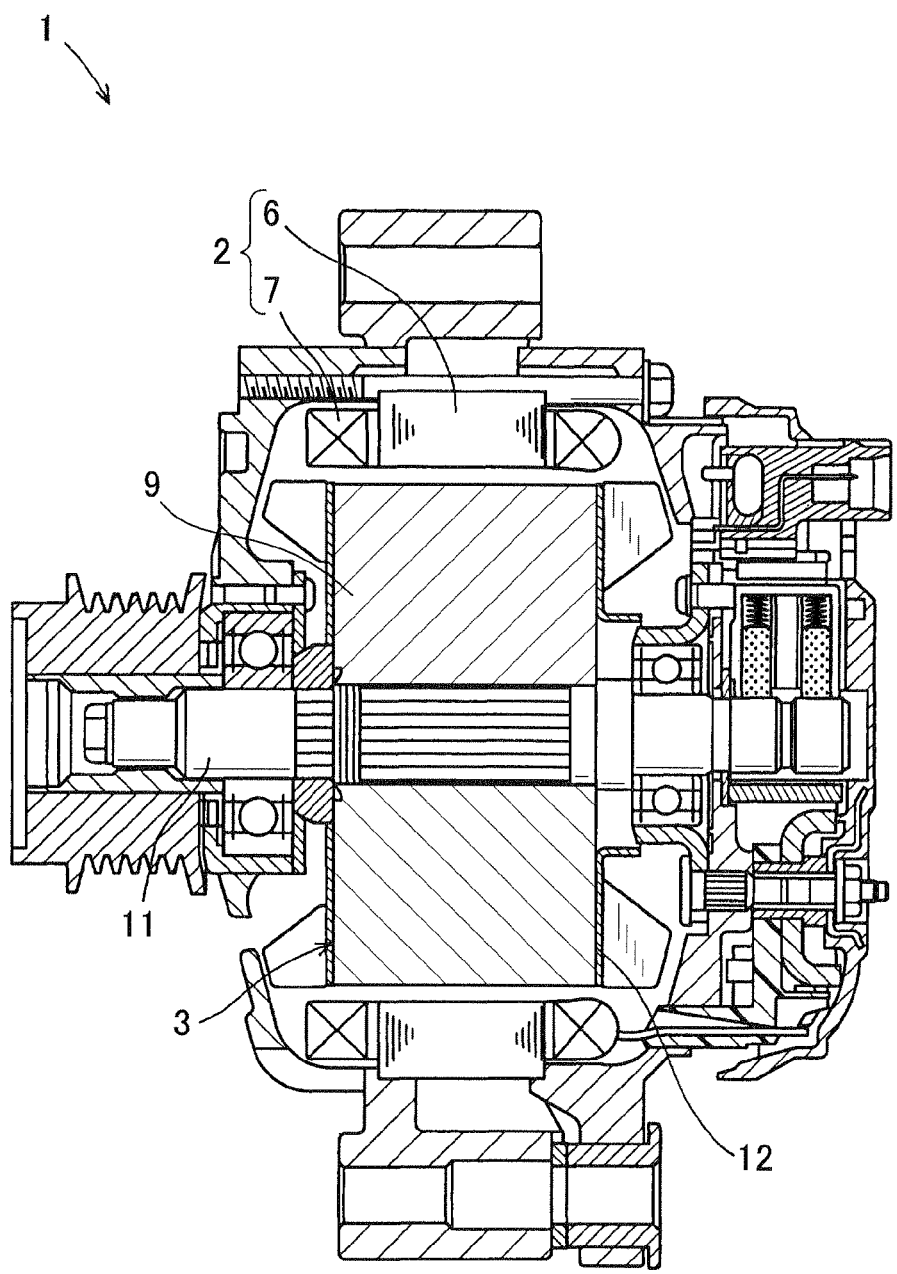
FIG. 1 shows a sectional view of a rotating electrical machine in a first embodiment.
Figure 2:
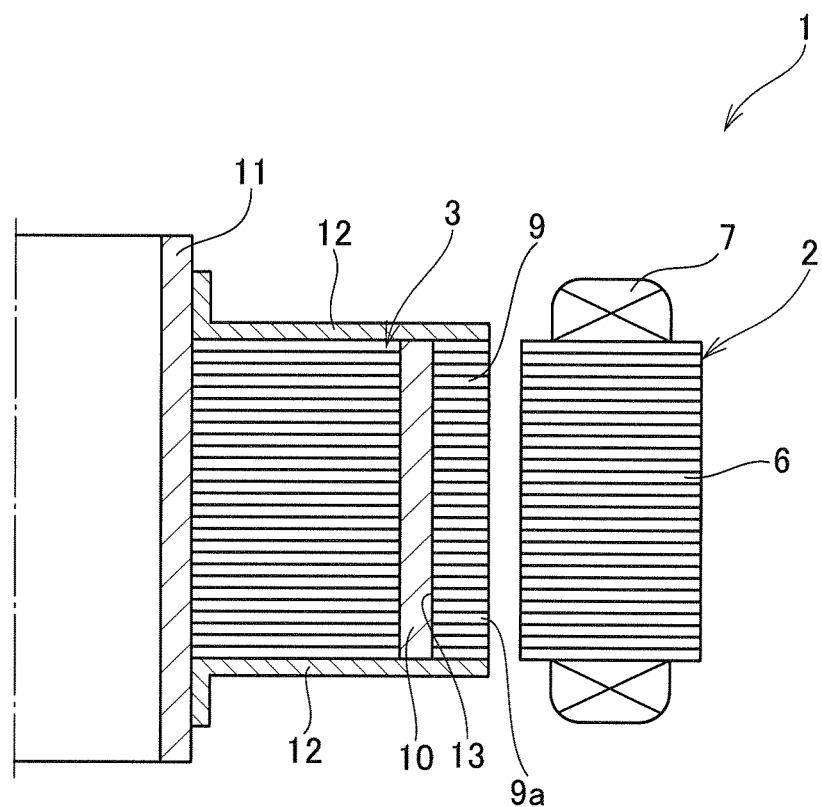
FIG. 2 shows a sectional view of a portion of a rotor in the first embodiment.

That is, the rotating electrical machine 1 of the present embodiment is an inner rotor type with which the rotor 3 is disposed at an inner circumference of the cylindrical stator 2. In addition, only one half of the rotating electrical machine 1 is shown in FIG. 2, to the left of the center line (dashed line).

The stator 2 has a stator core 6 formed by laminating a plurality of electromagnetic cylindrically, and a stator coil 7 wound around the stator core 6.

When three-phase alternating current flows into the stator coil 7, a revolving magnetic field is formed and rotates the rotor 3 that is disposed in the revolving magnetic field.

The rotor 3 is a permanent magnet type and has a rotor core 9 that is disposed at the inner circumference of the stator 2 coaxially with the stator 2, and a plurality of permanent magnets 10 embedded to the rotor core 9 that form a magnetic pole.

The rotor core 9 is formed cylindrically by laminating a plurality of electromagnetic plates, and a shaft 11 used as a rotating shaft is fixed to a center of the rotor core 9.

Moreover, end plates 12 that sandwich the rotor core 9 in an axial direction are disposed on both ends of the rotor core 9 in the axial direction.

Further, slots 13 for accommodating the permanent magnets 10 are formed in the rotor core 9 as holes extending in the axial direction.

In addition, the slots 13 are formed as holes penetrating in the axial direction of the rotor core 9 in the present embodiment.

Each permanent magnet 10 is formed in a shape that has a section perpendicular to the axial direction which is a rectangle.

That is, each permanent magnet 10 has a rectangular shape when seen from the axial direction.

When a direction perpendicular to a magnetization direction of the permanent magnet 10 is defined as a magnetization perpendicular direction, each permanent magnet 10 is short in the magnetization direction, and has a long rectangular section to the magnetization perpendicular direction.

The rotor 3 has a plurality of magnetic poles.

Figure 3A:
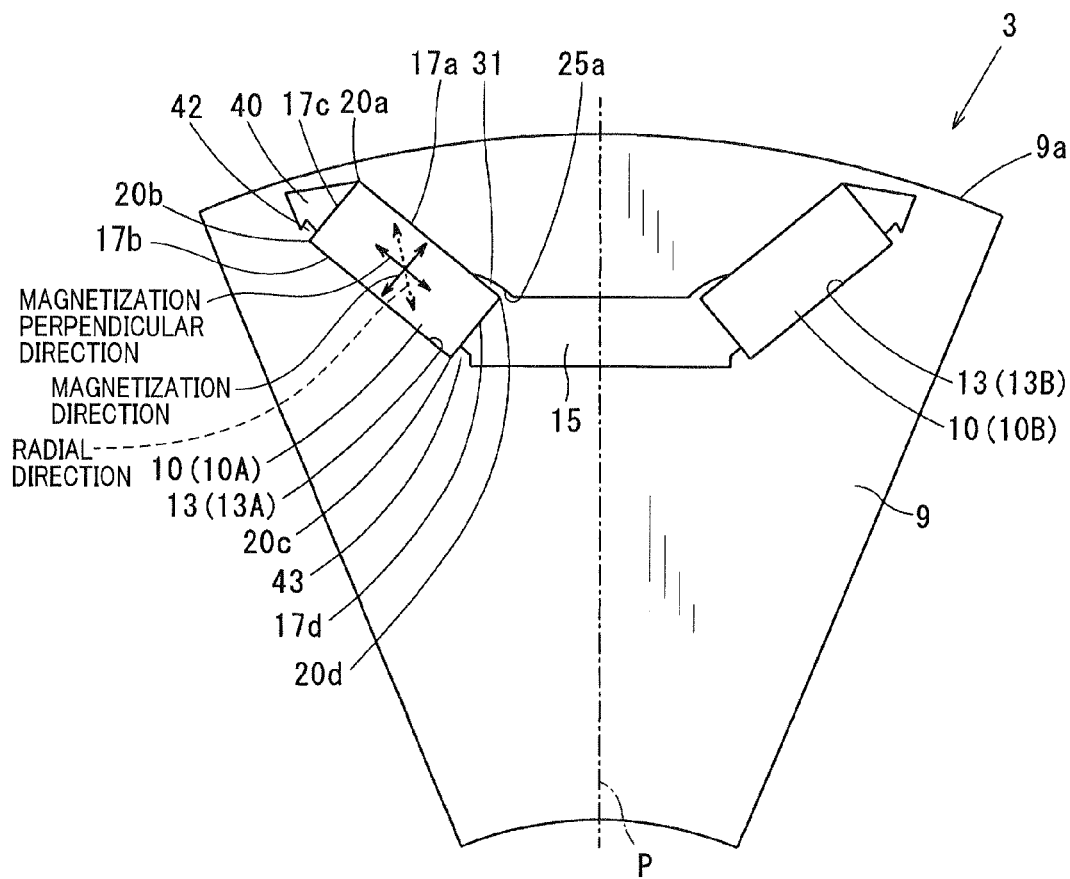
FIG. 3A shows a partial view of the rotor seen from an axial direction in the first embodiment.
Figure 3B:
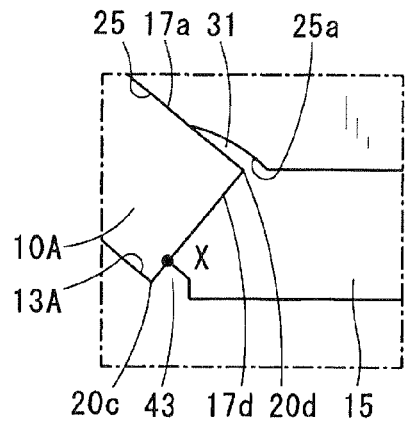
FIG. 3B shows an enlarged part of FIG. 3A in the first embodiment.

In addition, although the rotor 3 has eight magnetic poles in the present embodiment, only one magnetic pole is shown in FIG. 3A and FIG. 3B.

As shown in FIG. 3A and FIG. 3B, one magnetic pole is formed with the two permanent magnets 10 (10A, 10B) in the present embodiment.

Corresponding to this, the rotor core 9 has a slot 13A where the permanent magnet 10A is inserted, and a slot 13B where the permanent magnet 10B is inserted per one magnetic pole as the slots 13 where each permanent magnet 10 is inserted.

In addition, the slot 13A and the slot 13B are connected by a gap 15 to form one continuous space.

The permanent magnets 10A and 10B are symmetrically disposed centering a virtual line P in a radial direction that passes through a center between the permanent magnets 10A and 10B.

Specifically, the permanent magnet 10A and the permanent magnet 10B are arranged in a V-shape when seen from the axial direction so that the permanent magnets 10A and 10B open towards a perimeter surface 9a of the rotor core 9.

For this reason, the permanent magnets 10A and 10B are arranged so that the magnetization direction inclines to the radial direction of the rotor core 9 as shown in FIG. 3A by a dashed line arrow.

In addition, for the two permanent magnets 10A and 10B, the same pole faces to the perimeter side.

Further, the two slots 13A and 13B are formed corresponding to the two permanent magnets 10A and 10B, and the slot 13A and the slot 13B are formed in symmetrical shape centering the virtual line P.

The feature of the first embodiment is explained hereafter using the permanent magnet 10A and the slot 13A.

In addition, since the permanent magnet 10B and the slot 13B are the composition of line symmetry to the permanent magnet 10A and the slot 13A centering the virtual line P, as mentioned above, the explanation to the permanent magnet 10B and the slot 13B are omitted.

As shown in FIG. 3A and FIG. 3B, in the permanent magnet 10A, two sides parallel to the magnetization direction are defined as a side 17a and a side 17b, and two sides separated in the magnetization perpendicular direction and parallel mutually are defined as a side 17c and a side 17d.

When seen from the axial direction, the sides 17a and 17b are the sides perpendicular to the magnetization direction, and the sides 17c and 17d are the sides perpendicular to the magnetization perpendicular direction.

In addition, the side 17a is the side that faces to the stator 2, and the side 17d is the side that faces the gap 15e.

Moreover, a corner part between the side 17a and the side 17c is defined as a corner part 20a, a corner part between the side 17b and the side 17c is defined as a corner part 20b, a corner part between the side 17b and the side 17d is defined as a corner part 20c, and a corner part between the side 17d and the side 17a is defined as a corner parts 20d.

Here, the corner part 20c is a corner part that is most distant from the perimeter surface 9a of the rotor core 9 in the radial direction of the rotor core 9, and is defined as a first corner part 20c hereafter.

Further, the corner part 20d is a corner part in a position that faces the first corner part 20c in the magnetization direction of the permanent magnet 10A, and defined as a second corner part 20d hereafter.

Moreover, the side 17d that is a side between the first corner part 20c and the second corner part 20d is defined as a first side 17d hereafter.

Furthermore, in the magnetization perpendicular direction, a side where the first corner part 20c and the second corner part 20d exist is defined as a first end side of the magnetization perpendicular direction, and a side opposite to this is defined as a second end side of the magnetization perpendicular direction.

Next, a shape of the slot 13A is explained in detail.

A gap 31 is formed between the first end side part of the magnetization perpendicular direction of the side 17a including the second corner part 20d and an inner circumferential surface 25 of the slot 13A.

In addition, the side 17a is contacted to the inner circumferential surface 25 except at the first end side part in the magnetization perpendicular direction of the side 17a including the second corner part 20d.

The inner circumferential surface 25 that forms the gap 31, i.e., the inner circumferential surface 25a of the slot 13A that faces the second corner part 20d through the gap 31 has an arc surface when seen from the axial direction of the rotor core 9.

Moreover, an opening 40 is formed between the side 17c and the inner circumferential surface 25.

Moreover, the gap 15 is formed between the first side 17d and the inner circumferential surface 25.

In addition, the side 17b is contacted to the inner circumferential surface 25.

Moreover, the inner circumferential surface 25 has a magnet supporting part 42 that supports the permanent magnet 10A by contacting to an end part including the corner part 20b of the side 17c, and a magnet supporting part 43 that supports the permanent magnet 10A by contacting an end part including the corner part 20c of the first side 17d.

Further, a center of the arc of the inner circumferential surface 25a is a point nearest to the second corner part 20d in the inner circumferential surface 25 that contacts to the first side 17d in the present embodiment.

That is, the arc surface has a point X as a center on the inner circumferential surface 25 located in the stator side end of the magnet supporting part 43 that contacts to the first side 17d.

It should be appreciated that the gap 31, the opening 40, and the gap 15 may be simple gaps/openings, and may be filled with a substance whose magnetic permeability is lower than that of the rotor core 9. Resin may be filled in the gap, for example.

Moreover, a gap in the magnetization directions may be disposed between the side 17b and the inner circumferential surface 25.

[Functions and Effects of the First Embodiment]

According to the rotor 3 of the present embodiment, the gap 31 is disposed between the first end side part in the magnetization perpendicular direction of the side 17a and the inner circumferential surface 25 including the second corner part 20d.

Moreover, the inner circumferential surface 25a that faces the second corner part 20d through the gap 31 has the arc surface with the point X as the center on the inner circumferential surface 25 that faces the first corner part 20c.

The magnetic flux from the stator 2 side tends to pass along the rotor core 9 near the second corner part 20d, and tends to short-cut to the rotor core 9 near the first corner part 20c However, in the present embodiment, the rotor core 9 near the second corner part 20d exists in an equal distance from the rotor core 9 near the first corner part 20c in which the magnetic flux from the stator 2 side tends to short-circuit by disposing the gap 31 between the second corner part 20d and the inner circumferential surface 25, and by forming the inner circumferential surface 25a that forms the gap 31 to the arc surface.

Accordingly, a magnetic resistance near the second corner part 20d is neutralized, the magnetic flux from the stator 2 side is dispersed and passes through the near second corner part 20d, and short-cuts to the rotor core 9 near the first corner part 20c.

Figure 8A:
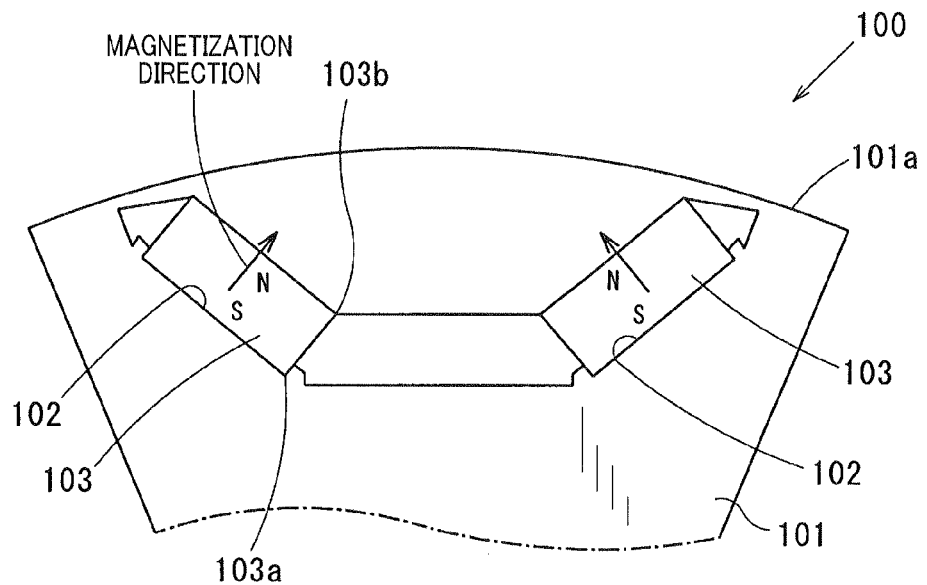
FIG. 8A shows a partial view of a conventional rotor seen from an axial direction.
Figure 8B:
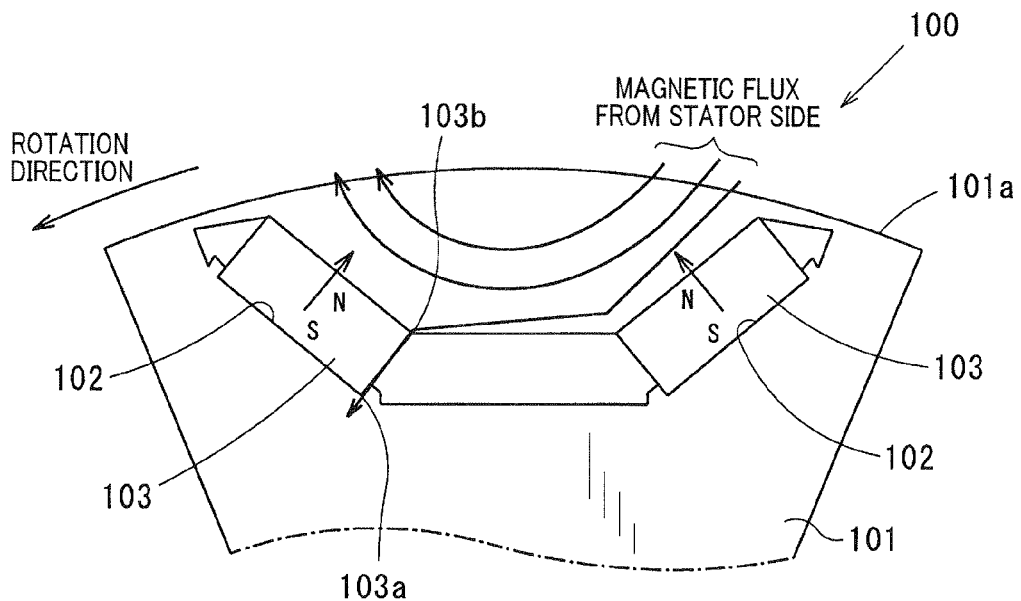
FIG. 8B shows a figure explaining a flow of a magnetic flux in the conventional rotor.

That is, as shown in FIG. 8B, conventionally, a demagnetizing field originating from the magnetic flux from the stator side acts intensively on the second corner part.

Figure 4:
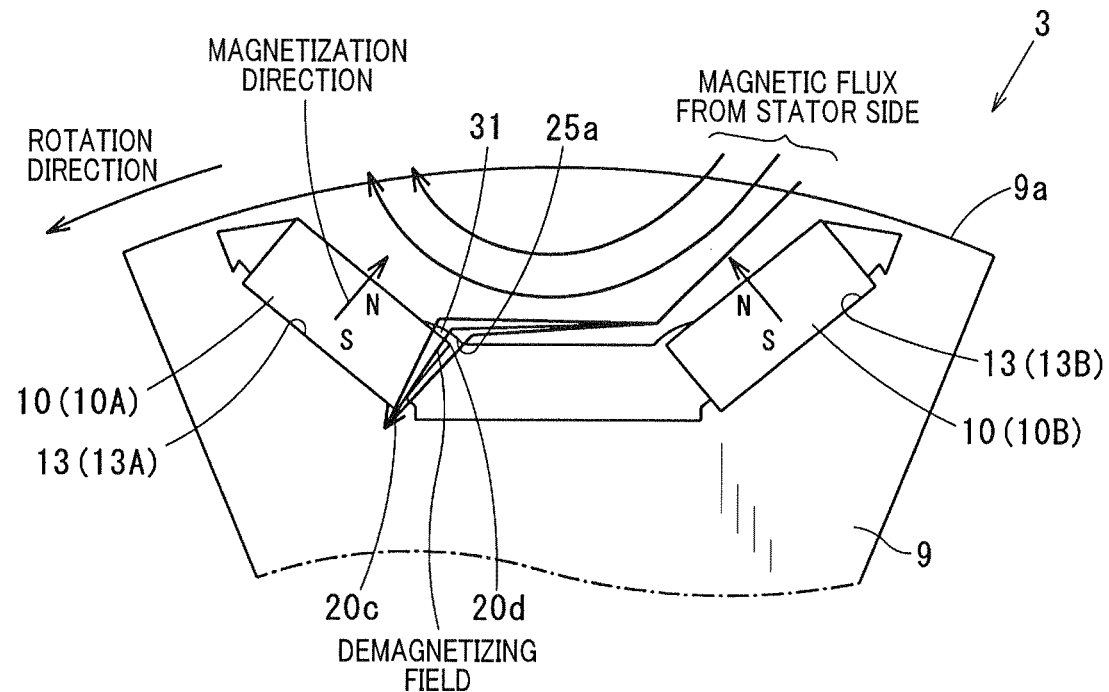
FIG. 4 shows a figure explaining a flow of a magnetic flux in the rotor in the first embodiment.

However, according to the present embodiment, as shown in FIG. 4, the demagnetizing field by the magnetic flux from the stator 2 side does not act intensively on the second corner part 20d of the permanent magnet 10, and a wide range of the permanent magnet 10 is equally affected by the demagnetizing field.

As a result, a peak intensity of the demagnetizing field can be made small.

Since a thickness of the permanent magnet 10 in the magnetization direction is configured to resist demagnetization that occurs based on a peak intensity of the demagnetizing field, when the peak intensity of the demagnetizing field becomes small, the thickness of the permanent magnet 10 can be made smaller in the magnetization direction, and as a result, the number of magnets required can be reduced.

[The Second Embodiment]

It should be appreciated that, in the following embodiments and the subsequent modifications, the components identical with or similar to those in the first embodiment are given the same reference numerals for the sake of omitting explanation.

Figure 5:
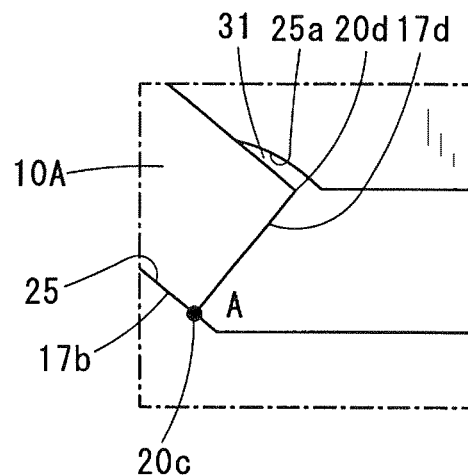
FIG. 5 shows an enlarged part of a rotor in a second embodiment.

A rotor 3 of the second embodiment is explained using FIG. 5 focusing on points that are different from the first embodiment.

In the second embodiment, the magnet supporting part 43 that supports the permanent magnet 10A by contacting the end part including the first corner part 20c of the first side 17d does not exist, and the inner circumferential surface 25 does not contact to the first side 17d.

In addition, the side 17b and the first corner part 20c are contacted to the inner circumferential surface 25.

Further, the side 17b and the first corner part 20c are contacted to the inner circumferential surface 25, and the center of the arc of the inner circumferential surface 25a that forms the gap 31 becomes a point A that the first corner part 20c of the inner circumferential surface 25 contacts.

The same function and effect as the first embodiment can be obtained by the present embodiment as well.

[The Third Embodiment]

Figure 6:
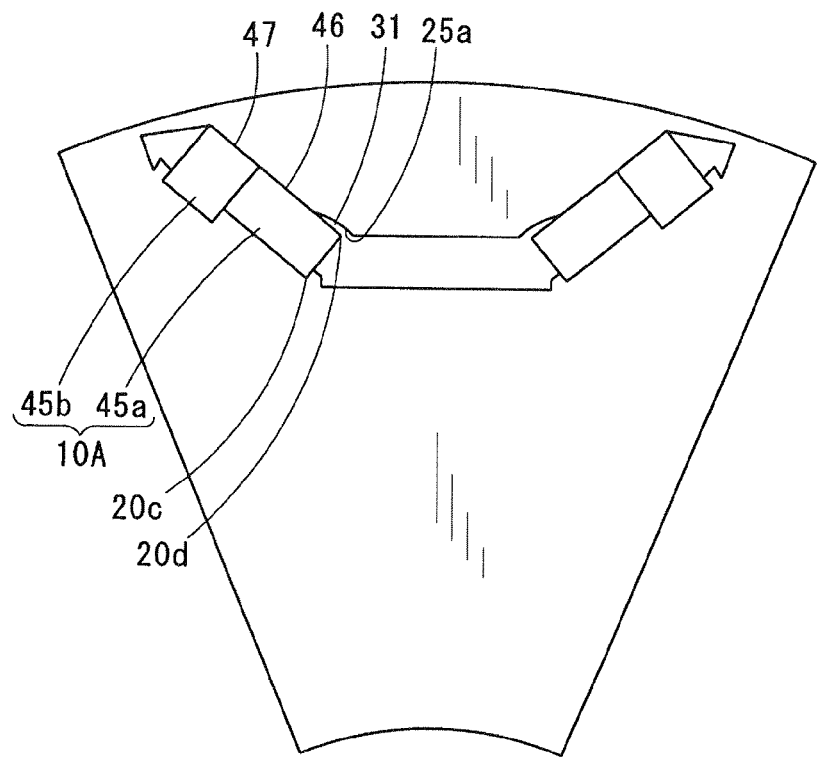
FIG. 6 shows a partial view of a rotor seen from an axial direction in a third embodiment.

A rotor 3 of the third embodiment is explained using FIG. 6 focusing on points that are different from the first embodiment.

In the third embodiment, each of permanent magnets 10A and 10B consists of a plurality of pieces of magnets.

Hereafter, details are explained by using the permanent magnet 10A.

The single permanent magnet 10A is constituted from two magnet pieces 45a and 45b in the present embodiment.

The two magnet pieces 45a and 45b are disposed side by side along with the magnetization perpendicular direction so that the magnetization directions of the magnet pieces 45a and 45b face the same direction.

Further, a thickness of the magnet piece 45a in the magnetization direction disposed in the first end side of the magnetization perpendicular direction is thinner than the thickness of the magnet piece 45b in the magnetization direction disposed in the second end side of the magnetization perpendicular direction.

Since the second corner part 20d side demagnetizing field is reduced according to the effect of the first embodiment, number of magnets required can be reduced by reducing the thickness in the magnetization direction in a region where demagnetizing field is reduced, i.e., in the second corner part 20d (the first end side in the magnetization perpendicular direction), even in the case where the peak intensity of the demagnetizing field arises in the second end side in the magnetization perpendicular direction of the permanent magnet 10A, for example, in the present embodiment.

Specifically, in a case where the peak intensity of the demagnetizing field arises in the second end side of the magnetization perpendicular direction of the permanent magnet 10A, comparing with a case where the permanent magnet 10A is divided and the present embodiment is applied, and a case where the thickness is increased to cope with the peak intensity of the demagnetizing field in the second end side of the magnetization perpendicular direction of the permanent magnet 10A without dividing the permanent magnet 10A, total size of permanent magnets required can be reduced by around 11% in the present embodiment.

Moreover, a plurality of magnet pieces 45a and 45b are arranged so that sides that face the stator 2 in the magnetization direction become flush with each other.

That is, the side 46 by the side of the stator 2 that intersects perpendicularly with the magnetization direction of the magnet piece 45a, and the side 47 by the side of the stator 2 that intersects perpendicularly with the magnetization direction of the magnet piece 45b are placed in order on the same straight line.

According to this, it becomes possible to bring the plurality of magnet pieces 45a and 45b close to the stator 2, and can reduce magnetic flux loss.

[Modification]

The embodiment of the present disclosure is not limited to the embodiment mentioned above, but various modifications can be considered.

For example, although the rotating electrical machine 1 of the embodiment is the inner rotor type that has the rotor 3 in the inner circumference side of the stator 2, an outer rotor type may be applied to the present disclosure.

Moreover, the corner parts 20a-20d of the permanent magnet 10 in the embodiments may be chamfered.

Moreover, although the permanent magnet 10 has a rectangle section in the embodiment, it is not restricted to this form.

For example, the magnetization direction length of the side 17c and the side 17d may be varied to form a trapezoid-like section.

Moreover, both the sides 17a and 17b may be arced having a center in the inner circumference or perimeter side, or the side 17c and the side 17d may be arced. Further, the side 17a-17d may be bent.

Further, although the permanent magnets 10 are arranged in the V-shape which opens towards the perimeter side of the rotor core 9, the permanent magnets 10 may be arranged in s V-shape which opens towards the inner circumference side of the rotor core 9.

Furthermore, although the side 17b and the first corner part 20c are contacting to the inner circumferential surface 25 in the second embodiment, the side 17b and the first corner part 20c may not contacted to the inner circumferential surface 25, but the inner circumferential surface 25 that faces the side 17b including the first corner part 20c may be parallel to the side 17b, and may have a gap between the inner circumferential surface 25 and the sides 17b.

However, in that case, a point on the inner circumferential surface 25 that faces the first corner part 20c is configured as a center of the arc of the inner circumferential surface 25a that faces the second corner part 20d through the gap 31.

Moreover, although the permanent magnet 10A is made of the two magnet pieces 45a and 45 in the third embodiment, the permanent magnet 10A may be made of three or more magnet pieces.

Further, the permanent magnet 10A may optionally not be divided but the first end side in the magnetization perpendicular direction may be made thinner than the second end side in the magnetization perpendicular direction.

Figure 7:
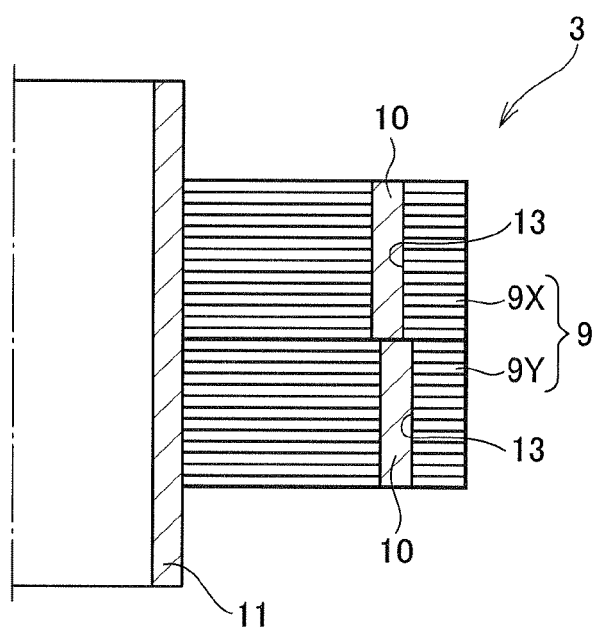
FIG. 7 shows a sectional view of a rotor in a modification.

Furthermore, in the rotor 3 as shown in FIG. 7, a skew may be formed by dividing the rotor core 9 into a plurality of (for example, two) blocks 9X and 9Y, disposing the slot 13 and the permanent magnet 10 for every block and shifting the position of the slot 13 and the permanent magnet 10 of each block in the circumferential direction.

In this case, the slot shape that is explained in the embodiment is applied to each block.

What is claimed is:

1. A rotor of a rotating electrical machine comprising:
   a rotor core that has a peripheral surface that faces a stator; and
   a permanent magnet embedded in a slot formed in the rotor core;
   wherein, the permanent magnet has a plurality of corner parts when seen from an axial direction of the rotor core;
   when a corner part that is most distant from the peripheral surface that faces the stator of the rotor core is defined as a first corner part and a corner part in a position that faces the first corner part in a magnetization direction of the permanent magnet is defined as a second corner part;
   a gap is formed between the second corner part and an inner circumference side of the slot; and
   the inner circumference side of the slot that forms the gap has an arc surface that has a center on the inner circumference side of the slot that faces the first corner part.

2. The rotor of the rotating electrical machine according to claim 1, wherein,
   the first corner part is contacted to the inner circumference side of the slot, and
   the center of the arc surface is a point that the first corner part of the inner circumference side of the slot contacts.

3. The rotor of the rotating electrical machine according to claim 1, wherein,
   when a side between the first corner part and the second corner part is defined as a first side in the permanent magnet,
   the inner circumference side of the slot that faces the first corner part includes the inner circumference side of the slot that contacts to the first side, and
   the center of the arc surface is a point nearest to the second corner part in the inner circumference side of the slot that contacts to the first side.

4. The rotor of the rotating electrical machine according to claim 1, wherein,
the permanent magnet is arranged so that the magnetization direction inclines to a radial direction of the rotor core, and has the second corner part and the first corner part in a first end side in a direction substantially perpendicular to the magnetization direction, and
a thickness of the permanent magnet in the first end side is thinner than a thickness of the permanent magnet in a second end side.

5. The rotor of the rotating electrical machine according to claim 2, wherein,
the permanent magnet is arranged so that the magnetization direction inclines to a radial direction of the rotor core, and has the second corner part and the first corner part in a first end side in a direction substantially perpendicular to the magnetization direction, and
a thickness of the permanent magnet in the first end side is thinner than a thickness of the permanent magnet in a second end side.

6. The rotor of the rotating electrical machine according to claim 3, wherein,
the permanent magnet is arranged so that the magnetization direction inclines to a radial direction of the rotor core, and has the second corner part and the first corner part in a first end side in a direction substantially perpendicular to the magnetization direction, and
a thickness of the permanent magnet in the first end side is thinner than a thickness of the permanent magnet in a second end side.

7. The rotor of the rotating electrical machine according to claim 4, wherein,
the permanent magnet is made of a plurality of magnet pieces,
the plurality of magnet pieces are disposed side by side along with the direction substantially perpendicular to the magnetization direction so that the magnetization directions of the magnet pieces face the same direction, and
thicknesses of the plurality of magnet pieces disposed in the first end side are thinner than thicknesses of the plurality of magnet pieces disposed in the second end side.

8. The rotor of the rotating electrical machine according to claim 5, wherein,
the permanent magnet is made of a plurality of magnet pieces,
the plurality of magnet pieces are disposed side by side along with the direction substantially perpendicular to the magnetization direction so that the magnetization directions of the magnet pieces face the same direction, and
thicknesses of the plurality of magnet pieces disposed in the first end side are thinner than thicknesses of the plurality of magnet pieces disposed in the second end side.

9. The rotor of the rotating electrical machine according to claim 6, wherein,
the permanent magnet is made of a plurality of magnet pieces,
the plurality of magnet pieces are disposed side by side along with the direction substantially perpendicular to the magnetization direction so that the magnetization directions of the magnet pieces face the same direction, and
thicknesses of the plurality of magnet pieces disposed in the first end side are thinner than thicknesses of the plurality of magnet pieces disposed in the second end side.

10. The rotor of the rotating electrical machine according to claim 7, wherein,
the plurality of magnet pieces are arranged so that sides that face the stator in the magnetization direction become flush with each other.

11. The rotor of the rotating electrical machine according to claim 8, wherein,
the plurality of magnet pieces are arranged so that sides that face the stator in the magnetization direction become flush with each other.

12. The rotor of the rotating electrical machine according to claim 9, wherein,
the plurality of magnet pieces are arranged so that sides that face the stator in the magnetization direction become flush with each other.

* * * * *